(12) United States Patent
Day et al.

(10) Patent No.: US 8,859,105 B2
(45) Date of Patent: Oct. 14, 2014

(54) CONFIGURATION FOR IMPROVING BONDING AND CORROSION RESISTANCE OF REINFORCEMENT MATERIAL

(75) Inventors: Donna C. Day, Vicksburg, MS (US); Melvin C. Sykes, Vicksburg, MS (US); Charles A. Weiss, Jr., Clinton, MS (US); Philip G. Malone, Vicksburg, MS (US); Earl H. Baugher, Jr., Albuquerque, NM (US)

(73) Assignee: United States of America as Represented by The Secretary of The Army

( * ) Notice: Subject to any disclaimer, the term of this patent is extended or adjusted under 35 U.S.C. 154(b) by 0 days.

(21) Appl. No.: 13/178,067

(22) Filed: Jul. 7, 2011

(65) Prior Publication Data

US 2011/0262756 A1   Oct. 27, 2011

Related U.S. Application Data

(62) Division of application No. 11/234,184, filed on Sep. 26, 2005.

(51) Int. Cl.
| | | |
|---|---|---|
| C04B 14/38 | (2006.01) | |
| C04B 20/00 | (2006.01) | |
| E04C 5/01 | (2006.01) | |
| C04B 14/48 | (2006.01) | |
| C23C 26/00 | (2006.01) | |
| C04B 35/18 | (2006.01) | |
| C04B 35/76 | (2006.01) | |
| C03C 8/14 | (2006.01) | |
| C03C 14/00 | (2006.01) | |

(52) U.S. Cl.
CPC ............... C23C 26/00 (2013.01); E04C 5/017 (2013.01); C03C 8/14 (2013.01); E04C 5/015 (2013.01); C03C 14/00 (2013.01); C04B 14/38 (2013.01); C04B 14/48 (2013.01); C04B 20/0068 (2013.01); C04B 35/18 (2013.01); C04B 35/76 (2013.01)
USPC ................ 428/432; 428/426; 501/17; 501/32

(58) Field of Classification Search
None
See application file for complete search history.

(56) References Cited

U.S. PATENT DOCUMENTS 3,002,857 A * 10/1961 Stalego .......................... 428/378
3,398,004 A * 8/1968 Pendleton et al. ............. 335/299

(Continued)

FOREIGN PATENT DOCUMENTS

WO    WO 9831890 A1 *  7/1998 ................ E04C 5/01

OTHER PUBLICATIONS

Hackler, Cullen L., "Porcelain Enameling," reprinted with permission from "Metals Handbook," 1995, pp. 459-460, vol. 5, ASM Committee on Porcelain Enameling, "Nonmetallic Coating Processes," Porcelain Enameling Institute, Inc., Nashville, TN, USA.

(Continued)

Primary Examiner — David Sample
(74) Attorney, Agent, or Firm — Brian G. Jones

(57) ABSTRACT

A coating for a reinforcing material, such as metal rebar, that increases the adhesion between the reinforcing material and a matrix, such as a cement-based mortar or concrete, in which the reinforcing material is embedded. The coating may comprise a glass frit mixed with a refractory material, such as dry Type I-II portland cement. The coating is bonded, typically by heat, to the surface of the reinforcing material. The reaction of the refractory component, e.g., portland cement, when the reinforcement, e.g., metal re-bar, is embedded in a matrix, e.g., fresh mortar or concrete, prevents the formation of soft precipitates at the interface of the matrix and its reinforcement. One coating comprises portland cement Type I-II combined with a commercial alkali-resistant glass frit. This coating is applied to a steel rebar and fired to bond to the rebar. The frit-refractory coating produces a strong bond between the metal rebar and concrete and may eliminate or significantly reduce the potential for corrosion of the rebar.

13 Claims, 2 Drawing Sheets

(56) References Cited

U.S. PATENT DOCUMENTS

| | | | |
|---|---|---|---|
| 4,346,556 A | | 8/1982 | Rice et al. |
| 4,407,769 A | | 10/1983 | Harada et al. |
| 4,439,255 A | * | 3/1984 | Imai et al. ................. 156/49 |
| 4,442,021 A | * | 4/1984 | Burge et al. ................. 252/390 |
| 4,598,018 A | * | 7/1986 | Beuscher ................. 428/389 |
| 4,683,019 A | | 7/1987 | Motoki |
| 4,863,773 A | * | 9/1989 | Rousseau et al. ................. 428/68 |
| 5,312,526 A | | 5/1994 | Miller |
| 5,332,619 A | * | 7/1994 | Lacoste et al. ................. 442/127 |
| 6,194,068 B1 | * | 2/2001 | Ohashi et al. ................. 428/379 |
| 6,303,183 B1 | * | 10/2001 | Wilczynski et al. ................. 427/193 |
| 6,458,423 B1 | | 10/2002 | Goodson |
| 6,648,962 B2 | | 11/2003 | Berke et al. |
| 6,685,822 B2 | | 2/2004 | Buenfeld et al. |
| 6,797,327 B1 | | 9/2004 | Willis et al. |
| 6,811,875 B2 | * | 11/2004 | Kikuchi et al. ................. 428/372 |
| 6,874,233 B2 | | 4/2005 | Harding |
| 7,323,234 B2 | | 1/2008 | Edmondson et al. |
| 7,472,522 B2 | | 1/2009 | Yang |
| 7,901,769 B2 | | 3/2011 | Brow et al. |
| 2003/0188667 A1 | | 10/2003 | Beard et al. |
| 2007/0264527 A1 | | 11/2007 | Sykes et al. |
| 2007/0293614 A1 | | 12/2007 | Zhou et al. |
| 2008/0248302 A1 | * | 10/2008 | Lee ................. 428/378 |

OTHER PUBLICATIONS

Hock, Vincent F., et al., "The Use of Vitreous Enamel Coatings to Improve Bonding and Reduce Corrosion in Concrete Reinforcing Steel," NACE Corrosion 2008 Technical Symposium, 2008, USA Engineer Research and Development Center, Vicksburg, MS, USA.

Weiss, Charles A., Jr, et al., "Use of Glass-Ceramic Coatings Containing Water-Reactive Components as a Bonding Layer Between Concrete and Metal," 34th International Conference on Advanced Ceramics and Composites (ICACC, 2010, USA Engineer Research and Development Center, Vicksburg, MS, USA.

Porcelain Enamel Institute, Inc., "Reactive P/E for Reinforcing Steel," First Firing Newsletter, Spring 2009, vol. 14, No. 2, pp. 1-2, Porcelain Enamel Institute, Inc., Nashville, TN, USA.

* cited by examiner

CONFIGURATION FOR IMPROVING BONDING AND CORROSION RESISTANCE OF REINFORCEMENT MATERIAL

RELATED INVENTIONS

Under 35 U.S.C. §121 this application is a division of, and claims the benefit of, prior co-pending U.S. patent application Ser. No. 11/234,184, Publication No. 2007/0264527 A1, System and Method for Increasing the Bond Strength Between a Structural Material and Its Reinforcement, by Sykes et al., filed Sep. 26, 2005 and incorporated herein by reference. This application is related to U.S. patent application Ser. No. 12/793,799, Configuration for Increasing the Bond Strength Between a Structural Material and Its Reinforcement, by Sykes et al., filed Jun. 4, 2010.

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

BACKGROUND

Metals embedded in concrete typically form very poor bonds with the contacting cement because there are no coupling compounds that form between the cement and the metal. In select embodiments of the present invention, nickel and cobalt-rich glass frits bond to steel and the glass frits on the steel bond to bulk construction materials embedded in the glass frits on the steel. These bulk materials may comprise portland cement clinker, mica, quartz, aluminum silicate, other refractory inorganic compounds, and the like. A configuration comprising one or more of these bulk materials bound in the surface of a glass frit effects a tight bond to the calcium silicate hydrate that forms as the portland cement in the concrete hydrates.

DETAILED DESCRIPTION

Figure 1:
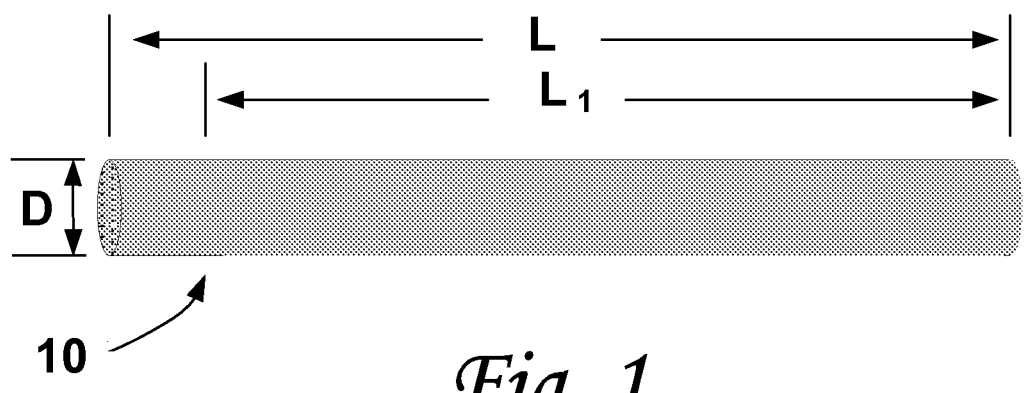
FIG. 1 depicts an element that may be coated with a configuration of the present invention.

Adding material of a non-melting mineral type, i.e., refractory material, to a low-melting temperature glass frit; combining the two as a coating; coating some reinforcing steel rods with the resultant combination and firing the resultant coating (or glaze) increases the strength of the bond to concrete as compared to uncoated (or unglazed) steel rods, such as uncoated rebar used to reinforce concrete. In select embodiments of the present invention, steel rods are coated with a coating (or glaze) combining a commercial powdered glass frit and particles of one or more refractory materials such as mica, glass slag, portland cement clinkers and the like. In select embodiments of the present invention, the frit and refractory material are suspended in a liquid carrier, such as water. Refractory materials are those materials that do not melt at temperatures that fuse (solidify) frits used in making the coatings used in select embodiments of the present invention.

In select embodiments of the present invention, coatings or glazes ("enameling") of a rough finish texture are fired on metal structure. The resultant "rough-enamel" coating is employed to improve the bonding of a variety of cement-based mortars or concretes to a variety of metals, such as steel, stainless steel, aluminum, copper and the like, or items plated with these metals.

In select embodiments of the present invention, flowable frit mixtures, preferably in a liquid carrier mixed with a thickener added to the liquid, are combined with a refractory additive of appropriate dimension to yield a rough or "bumpy" enameled surface after firing. In select embodiments of the present invention, the refractory additives may be one or more of the following types: dry portland cement, mica, slag, and the like. These refractory additives are combined with one or more suitable frits and applied as one or more coatings (or glazes) on reinforcing materials such as steel rebar, metal fibers, and the like. In select embodiments of the present invention, a reinforcement coated with one or more of the above "frit-bonding" mixtures (or rough glazes) appropriately fired on the reinforcing material, e.g., rebar, is added as reinforcement to structural material during its flowable stage (such stage as may be present in a portland cement-based mortar paste or concrete paste) and then permitted to cure.

In select embodiments of the present invention, the selected frit in the combination coating (or glaze) needs to bond to steel. Thus, the frit contains a transition metal, e.g., nickel, cobalt, and the like, to facilitate this bond. Bonding of the "coated (or glazed) and fired" steel to an embedding matrix, such as concrete in its paste form, is most likely not improved by applying multiple coats of a "frit-bonding" mixture. Thus, with steel rebar for example, it is proper to use a combination of a suitable bonding frit and a refractory material. A suitable bonding frit for steel is a groundcoat enamel that bonds directly to the steel, not to another enamel. In select embodiments of the present invention, the coating (or glaze) is produced by suspending in the groundcoat enamel one or more high melting point (refractory) materials, such as a ceramic of portland cement clinkers, mica flakes, slag glass and the like. The composition of a typical alkali-resistant groundcoat enamel for steel is shown in Table 1.

TABLE 1

Composition of a typical alkali-resistant groundcoat enamel for steel

| Constituent | Amount (%) |
|---|---|
| Silicon dioxide ($SiO_2$) | 42.02 |
| Boron oxide ($B_2O_3$) | 18.41 |
| Sodium oxide ($Na_2O$) | 15.05 |
| Potassium oxide ($K_2O$) | 2.71 |
| Lithium oxide ($Li_2O$) | 1.06 |
| Calcium oxide (CaO) | 4.47 |
| Aluminum oxide ($Al_2O_3$) | 4.38 |
| Zirconium oxide ($ZrO_2$) | 5.04 |
| Copper oxide (CuO) | 0.07 |
| Manganese dioxide ($MnO_2$) | 1.39 |
| Nickel oxide (NiO) | 1.04 |
| Cobalt Oxide ($Co_3O_4$) | 0.93 |

TABLE 1-continued

Composition of a typical alkali-resistant groundcoat enamel for steel

| Constituent | Amount (%) |
|---|---|
| Phosphorous Pentoxide ($P_2O_5$) | 0.68 |
| Fluorine ($F_2$) | 2.75 |

In select embodiments of the present invention, a method for improving a bond between reinforcing material and a matrix incorporating the reinforcing material, comprises: selecting one or more flowable fits, such as an alkali-resistant groundcoat enamel, the fits compatible with the matrix and reinforcing material; selecting refractory material compatible with the matrix, reinforcing material and fits; combining the refractory material with the fits to yield one or more coatings (or glazes); preparing one or more surfaces of the reinforcing material; applying one or more coatings (or glazes) to the surfaces; selecting a temperature regime for firing the coatings (or glazes) onto the reinforcing material; selecting a time regime for conducting the firing; firing the coatings (or glazes) on the reinforcing material at the selected temperature regime for the selected time regime; cooling the resultant coated (or glazed) reinforcing material; inserting the resultant cooled reinforcing material into the matrix while the matrix is flowable, and curing the resultant reinforced flowable matrix.

In select embodiments of the present invention, a method for reinforcing a matrix by incorporating an enhanced reinforcing material therein, comprises: selecting one or more flowable frits compatible with the matrix and the reinforcing material; selecting refractory material compatible with the matrix, the reinforcing material and the fits; mixing the refractory material with the frits to yield one or more coatings (glazes); preparing one or more surfaces of the reinforcing material; applying one or more of the coatings (glazes) to the surfaces; selecting a temperature regime for firing the coatings (glazes) onto the reinforcing material; selecting a time regime for conducting the firing; firing the coatings (glazes) on the reinforcing material at the selected temperature and time regimes; cooling the resultant coated (glazed) reinforcing material; inserting the resultant cooled coated (glazed) reinforcing material into the matrix while the matrix is flowable, and curing the resultant reinforced flowable matrix.

In select embodiments of the present invention, a method for producing an enhanced reinforcing material for incorporating in a matrix comprises: selecting one or more flowable frits compatible with the matrix and a base reinforcing material; selecting refractory material compatible with the matrix, the base reinforcing material and the frits; combining the refractory material with the frits to yield one or more coatings (or glazes); preparing one or more surfaces of the base reinforcing material; applying one or more of the coatings (or glazes) to one or more of the surfaces; selecting a temperature regime for firing the coatings (or glazes) onto the reinforcing material; selecting a time regime for conducting the firing; firing the coatings (or glazes) on the reinforcing material at the selected temperature and time regimes and cooling the resultant coated (or glazed) reinforcing material.

In select embodiments of the present invention, a configuration is affixed to a base reinforcing material for improving the bond between the base reinforcing material and an initially flowable matrix incorporating the resultant enhanced reinforcing material. The configuration comprises one or more flowable fits compatible with the matrix and the base reinforcing material and refractory material compatible with the matrix, the base reinforcing material and the frits, such that: the refractory material is combined with the fits to yield one or more coatings (or glazes); one or more surfaces of the reinforcing material are prepared for accepting the coatings (or glazes); one or more coatings (or glazes) are applied to the prepared surfaces, the coatings (or glazes) are fired on the reinforcing material during a pre-specified temperature regime and for a pre-specified time regime; the resultant coated (or glazed) reinforcing material is cooled; the resultant cooled enhanced reinforcing material is inserted into the matrix while the matrix is flowable and the resultant reinforced flowable matrix is cured.

In select embodiments of the present invention, an enhanced reinforcing structure for improving bonding of the enhanced reinforcing structure to a matrix incorporating the enhanced reinforcing structure comprises: one or more base reinforcing materials, each having one or more surfaces to be coated; one or more flowable frits compatible with the matrix and the base reinforcing materials and refractory material compatible with the matrix, the base material and the fits, such that: the refractory material is combined with the frits to yield one or more coatings (or glazes); one or more surfaces of the base reinforcing material are prepared for accepting the coatings (or glazes); one or more coatings (or glazes) are applied to one or more of the prepared surfaces; one or more of the coatings (or glazes) are fired onto one or more of the surfaces during a pre-specified temperature regime over a pre-specified time regime; the resultant enhanced reinforcing structure is cooled; the resultant cooled enhanced reinforcing structure is inserted into the matrix while the matrix is flowable and the resultant flowable matrix incorporating the resultant enhanced reinforcement is cured.

In select embodiments of the present invention, surfaces of the base reinforcing material are prepared for coating by cleaning and degreasing.

In select embodiments of the present invention, the base reinforcing material is selected from the group consisting of: metal fibers, metal rods, steel fibers, steel rods, metal alloy fibers, metal alloy rods, metal, metal alloys, steel, stainless steel, aluminum, copper, material plated with metal, and combinations thereof.

In select embodiments of the present invention, steels that may be used are selected from the group consisting of: low-carbon steel; decarburized steel; interstitial-free steel, i.e., steels in which carbon and nitrogen are contained in an alloying element such as titanium, niobium, vanadium and the like; titanium-stabilized steel, and combinations thereof.

In select embodiments of the present invention, the initially flowable matrix is a cement-based paste selected from the group consisting of: portland cement-based mortars; portland cement-based concretes; phosphate-cement based mortars; phosphate-cement based concretes; aluminum silicate cement-based mortars; aluminum silicate cement-based concretes, and combinations thereof.

In select embodiments of the present invention, frits are selected from the group consisting of: a ground glass, a ground glass slag, a frit suspended in a liquid, a glass frit suspended in a liquid, a powdered frit, a powdered glass frit, a frit containing transition metals, a frit containing cobalt, a frit containing nickel, an alkali resistant glass frit, and combinations thereof.

In select embodiments of the present invention, coatings (or glazes) comprise approximately equal amounts by volume of a frit and a refractory material. In select embodiments of the present invention, the frit may be a powdered glass frit and the refractory material dry portland cement, such as a type I-II portland cement. In select embodiments of the present invention, the dry portland cement may be provided in a proportion of up to about 70% by volume of the final coating. In select embodiments of the present invention, the coating (or glaze) may comprise a frit suspended in a liquid and a dry refractory material in approximately equal amounts by volume of the liquid suspension and the refractory material. In select embodiments of the present invention, the coating (or glaze) may comprise equal amounts by volume of a liquid suspension of an alkali-resistant glass frit and portland cement, such as a type I-II portland cement. In select embodiments of the present invention, the liquid suspension of an alkali-resistant glass frit may be a commercially available enamel groundcoat.

Surfaces are typically prepared for groundcoat enameling using an acid etch/nickel deposition preparation process. One such process is described in *Porcelain Enameling*, reprinted from *Metals Handbook*, Volume 5, ASM Committee on Porcelain Enameling, "Nonmetallic Coating Processes," Porcelain Enameling American Society for Metals, 1995, with permission of the American Society of Metals, by Porcelain Enamel Institute, Inc., Nashville, Tenn., pp 459-460. The acid etch/nickel deposition process involves placing components to be coated (or glazed) on corrosion-resistant racks and either dipping or spraying the parts with various solutions in a prescribed order and for a prescribed time regime at each step.

Specifically, the steps are:
1). Clean with an alkaline cleaner using a 2-step process for spray cleaning
2). Warm rinse with water
3). Cold rinse with water
4). Pickle in a warm dilute sulfuric acid solution
5). Cold rinse in a cold dilute sulfuric acid solution
6). Deposit nickel
7). Cold rinse in a cold dilute sulfuric acid solution
8). Neutralize with a suitable liquid solution having a basic pH Table 2, as provided in *Porcelain Enameling*, establishes specific ranges for the above process.

TABLE 2

Ground-Coat Enameling, Acid-etch/Nickel-deposition Process.

| | | | | Cycle time (min) | |
|---|---|---|---|---|---|
| Step | Solution | Composition | ° C. | Dip | Spray |
| 1 | Alkaline Cleaner[a] | 15-60 g/L[b] | Ambient to 100°[c] | 6-12 | 1-3 |
| 2 | Warm Rinse | Water | 49-60° | 0.5-4 | 0.5-1 |
| 3 | Cold Rinse | Water | Ambient | 2-4 | 0.5-1 |
| 4 | Pickle[d] | $H_2SO_4$, 6-8% | 66-71° | 5-10 | 3-5 |
| 5 | Cold Rinse | Water, $H_2SO_4$[e] | Ambient | 0.5-4 | 0.5-1 |
| 6 | Nickel deposition[f] | $NiSO_4$ 6 $H_2O$, 5.6-7.5 g/L | 60-82° | 5-10 | 4-6 |
| 7 | Cold rinse | Water, $H_2SO_4$[e] | Ambient | 0.5-4 | 0.5-1 |
| 8 | Neutralize | ⅔ $Na_2CO_3$, ⅓ borax, 0.6-2.1 g/L | Ambient | 1-6 | 1-2 |

[a]For spray cleaning, use a two-stage process.
[b]For spray cleaning, use 3.8-15 g/L.
[c]60-82° C. for spray cleaner.
[d]Weight loss of metal is 3-5 g/m².
[e]Maintain a pH in the solution of 3-3.5 to prevent formation of ferric iron.
[f]Nickel deposit should be 0.2-0.6 g/m²; continuous filtration is used to remove $Fe(OH)_3$.

After drying at 93-150° C., steel parts treated with this process have a light straw color. When low-carbon decarburized steel is enameled in a direct operation, the steel is etched to remove 11-22 g/m² of surface metal and receives a surface deposit of 0.9-1.3 g/m² of nickel. A ferric sulfate etching solution is sometimes used with decarburized steel.

In select embodiments of the present invention, coatings (or glazes) are applied via a method selected from the group consisting of: spraying, dipping, brushing, flowing on, electrostatic spraying, rolling, and combinations thereof.

In select embodiments of the present invention, the temperature regime involves inserting the coated (or glazed) reinforcing material into an oven pre-heated to the final temperature of said firing. In select embodiments of the present invention, the final temperature of firing the coating (or glaze) is from about 500° C. to about 900° C., and preferably from about 800° C. to about 875° C.

In select embodiments of the present invention, the time regime is that time after inserting the coated (or glazed) reinforcing material into an oven pre-heated to the final temperature of firing until removal of the fired reinforcing material from the oven. In select embodiments of the present invention, the time of firing is selected to be from about two minutes to about 45 minutes and preferably from about 15 minutes to about 30 minutes.

In select embodiments of the present invention, cooling of the fired reinforcing material is done by removing the fired reinforcing material from the oven and permitting the reinforcing material to reach ambient temperature in ambient air.

In select embodiments of the present invention, portland cement is employed as both the refractory material to be combined with a frit and at least part of the composition of the matrix to be reinforced. Portland cement-based concrete begins as a strong alkaline paste. This paste varies in pH from about the pH of calcium hydroxide (12.5) to almost 14 depending on the amount of sodium present. This high alkalinity dictates selection of a frit that is alkali-resistant. Typically, alkali-resistant glass is made by adding zirconium to the basic silica-sodium-borate composition. Further, when a highly alkaline paste attacks glass, it typically forms a gel that tends to swell unless the gel is stabilized with a lithium compound. Existing alkali-resistant glass fits are made with both zirconium and lithium, thus, for a portland cement-based matrix, fits are selected from among existing (commercial) alkali-resistant frits. Some examples include "Cermet" from Thompson Enamel Co., Bellevue, Ky.; "Frit 2680 Transparent," also from Thompson; and "F-579 Frit" from Fusion Ceramics, Inc., Carrollton, Ohio.

In select embodiments of the present invention, one or more flowable frits are combined with one or more refractory materials (i.e., those inorganic materials having a melting point higher than that of the frits) such as portland cement clinkers, mica flakes, and the like. The resultant combination is compatible with an embedding matrix, such as a portland cement-based mortar, in which the enhanced reinforcing material is to be inserted. In addition to improving the bond between the base reinforcing material and the matrix, the "frit-bonding" coating (or glazing) may eliminate or reduce the rate of corrosion of metal or metal-plated reinforcement coated with it in accordance with an embodiment of the present invention.

In select embodiments of the present invention, at least three approaches exist for establishing an improved bond of a matrix to reinforcement material embedded in the matrix. First, the embedding matrix, such as a portland cement-based concrete or mortar paste, may be designed to etch, and thus bond with a particular established glass coating (or enamel) on a reinforcement, such as rebar. Second, the glass (or enamel) coating on the reinforcement material may be abraded to form a rough (more chemically active) surface and a dry "powdered" refractory material, such as portland cement or glass slag and the like, applied to the roughened surface to enhance the bond of the reinforcement to a structural matrix, such as portland cement-based mortar or concrete. Third, a preferred approach of select embodiments of the present invention, flowable frit materials may be combined with a refractory material to yield a coating mixture (or glaze) that is subsequently applied to the surface of a base reinforcement material and fired. The resultant coated (or glazed) reinforcement material is permitted to cool and then inserted in an initially flowable matrix, such as a paste of a portland cement-based mortar or concrete.

In select embodiments of the present invention, equal volumes of a ground glass frit, preferably an alkali-resistant frit, and portland cement are combined to prepare a mixture to be used as a "bonding-frit" coating (or glaze). In select embodiments of the present invention, the glass may be a combination of glass types such as are available from a recycling plant. More than 50% by volume portland cement may be used. In select embodiments of the present invention, up to about 70% by volume of the "bonding-frit coating" (or glaze) may be portland cement. In select embodiments of the present invention, the texture of the resultant bonding-frit coating (or glaze) may range from a fine sand, such as a quartz sand, to a fine powder, such as portland cement.

In select embodiments of the present invention, a "ground glass" bonding-frit coating (or glaze) is applied by making a slurry of the mixture of ground glass and portland cement using water or water mixed with a thickener or adhesive, such as methyl cellulose. The base reinforcing item, such as a steel rebar, may be coated by dipping, spraying, brushing, rolling or flow coating the slurry onto the surface. The resultant wet coating is typically air-dried prior to firing. In select embodiments of the present invention, the bonding-fit coating may be applied in its dry state by electro-static spray such as any of the methods used in commercial powder coating.

Further, the method may be used to strongly bond two pieces of material each incorporating a rough (bumpy) enameled surface, prepared in accordance with embodiments of the present invention, at the interface to be joined. The two pieces may be joined by applying a suitable matrix, such as a portland cement-based grout, as an adhesive.

In select embodiments of the present invention, a method of enhancing bonding between surfaces of materials comprises: selecting one or more first and one or more second surfaces to be bonded; selecting one or more first flowable frits compatible with materials comprising the first surfaces; selecting first refractory material compatible with the first surfaces and the first fits; mixing the first refractory material with the first frits to yield one or more first coatings; preparing the first surfaces; applying one or more first coatings to the first surfaces; selecting one or more second flowable frits compatible with the materials comprising the second surfaces; selecting second refractory material compatible with the second surfaces and the second fits; mixing the second refractory material with the second fits to yield one or more second coatings; preparing the second surfaces; applying the second coatings to the second surfaces; selecting one or more temperature regimes for firing each of the first and second coatings onto the first and second surfaces, respectively; selecting a time regime for conducting each of the firings of the first and second coatings; firing the first and second coatings onto the first and second surfaces respectively at the selected temperature regimes for the duration of the selected time regimes; cooling the fired first and second surfaces; applying one or more grouts to one or more of the first and second fired surfaces; bringing one or more of the grouted surfaces in contact with one or more of the ungrouted surfaces to effect a bond between the first and second surfaces; and curing the grout.

EXAMPLE I

In laboratory tests, the bonding-frit coating (glaze) was prepared by combining about 50% by volume of a portland cement type I-II with a 50% by volume of a commercial alkali-resistant ground coat enamel to yield a frit-bonding liquid coating. In select testing, this coating was applied to the experimental rods and fired at temperatures from about 805-870° C. At this temperature range, heat exposure ranged from about 2-12 minutes. The goal was to produce a final coating (or glaze) that is about 50-100 µm (2-4 mils) thick, including the refractory material embedded therein. Thin spots were corrected by applying more bonding-fit coating (or glaze) at the thin areas and firing a second time.

EXAMPLE II

Two sets of smooth (un-deformed) AISI C1018 steel rods, 72 mm in length and 6.35 mm in diameter, were treated in accordance with a method of an embodiment of the present invention. Unmodified rods were threaded at one end and used as a control. These control rods (threaded version not shown separately) were cleaned with oxalic acid and water, rinsed with tap water, rinsed with dilute sulfuric acid, rinsed with distilled water, and given a final rinse of alcohol and allowed to air dry.

The surfaces of experimental steel rods "enhanced" in accordance with an embodiment of the present invention were prepared by: cleaning with an alkali-based solution; water rinsing preferably with warm water (in a range of about 45-60° C.); water rinsing, preferably with cold water (ambient, i.e., about 15-25° C.); acid-etching in a sulfuric acid solution of about 6-8%; cold rinsing with a dilute sulfuric acid solution of pH of about 3.0-3.5; nickel deposition at about 0.02 to 0.06 g/m$^2$ as described above from *Porcelain Enameling*; cold rinsing in a dilute sulfuric acid solution of pH about 3.0-3.5; and final rinsing in a sodium carbonate/sodium borate solution.

Refer to FIG. 1 describing the control and experimental rods used, where $L_1$=65 mm, L=72 mm and D=6.5 mm. All rods 10 were threaded for about 7 mm ($L-L_1$) of their length, L, similar to threading 21 of FIG. 2. The rods 10 were threaded to facilitate "pull out" testing.

Figure 2:
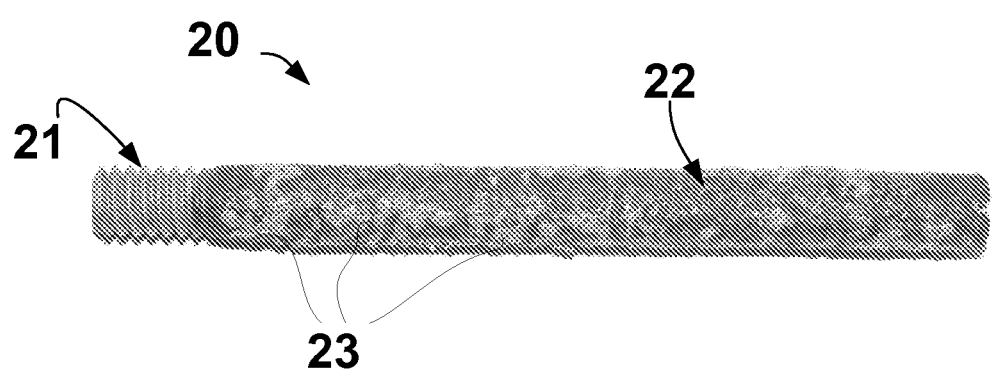
FIG. 2 is a photograph of a metal rod coated with a configuration of the present invention.

Refer to FIG. 2 depicting a photograph of one of the coated (or glazed) and fired experimental rods 20. None of the experimental rods 20 were abraded in test described herein. The experimental rods were dipped into a water-based suspension of commercial glass frit (VitrearcTransparent Prussian Blue Cat. No. 2680, Thompson-Enamel Co., Bellevue, Ky.), portland cement Type I-II, and methyl cellulose thickener (Klyr-Fire #A-1, Thompson-Enamel Co., Bellevue, Ky.). After coating (or glazing) with the "frit-bonding" suspension, the experimental rods 20 were permitted to air-dry and then fired in an electric furnace, resulting in a finished product 20 as represented in FIG. 2. After firing, the experimental rods 20 were allowed to air cool. Portions of the resultant fired frit-bonded coating (or glaze) 22 are portland cement embedded in the surface of a cobalt-doped blue glass and appear as light-colored areas 23 in the "frit-bonding" coating (or glaze) 22. The furnace temperature for the rod 20 photographed in FIG. 2 was 816° C., maintained for 30 minutes. For other experimental rods 20, the rods 20 were maintained at 745° C. for approximately 15 minutes.

The rods 10, 20 were inserted to a depth of 65 mm in a 76 mm (3 in) diameter, 152 mm (6 in) long cylinder 31 containing a portland cement-based mortar paste. The standard mortar described in the ASTM C 109 section on proportioning was used to prepare the mortar cylinders 31. After the rods 10, 20 were inserted in the mortar paste; each cylinder 31 was consolidated by vibrating the mortar paste for thirty seconds. All cylinders 31 were moist-cured for seven days.

Figure 3:
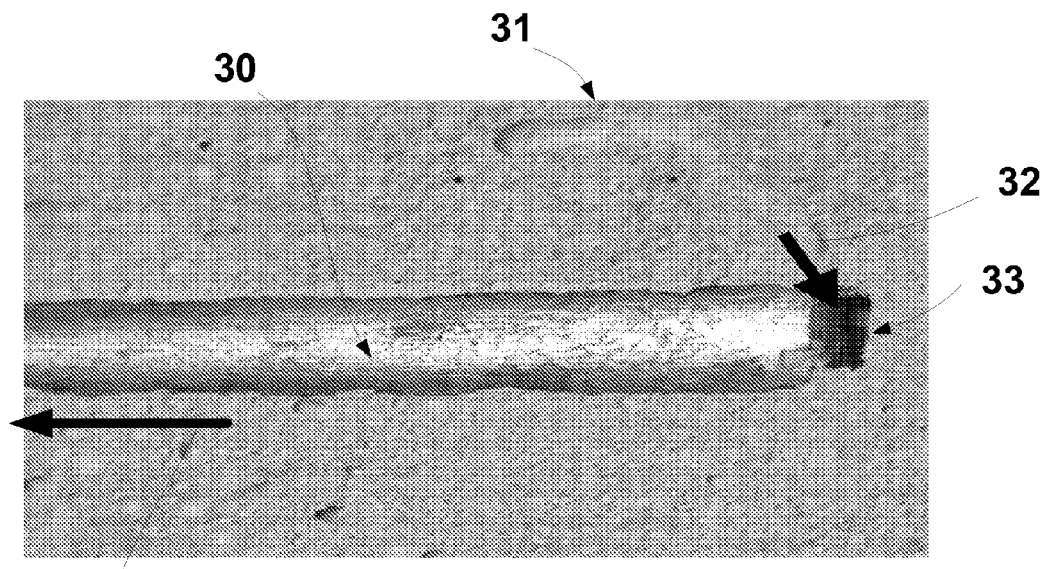
FIG. 3 is a photograph of a fractured split section of a portland cement-based mortar cylinder and the rod of FIG. 2 after it has been extracted a short distance from the cylinder.

Refer to FIG. 3, a photograph of a section of a typical cylinder 31 split lengthwise along one side of the inserted rod 30. In this photo, the rod 30 has been extracted in the direction of the arrow 34 only a short distance as indicated at the arrow 32 to show a small portion of the void 33 resultant from extraction. FIG. 3 also shows how the experimental rod 30 was stripped completely of its coating (or glaze) 22.

Figure 4:
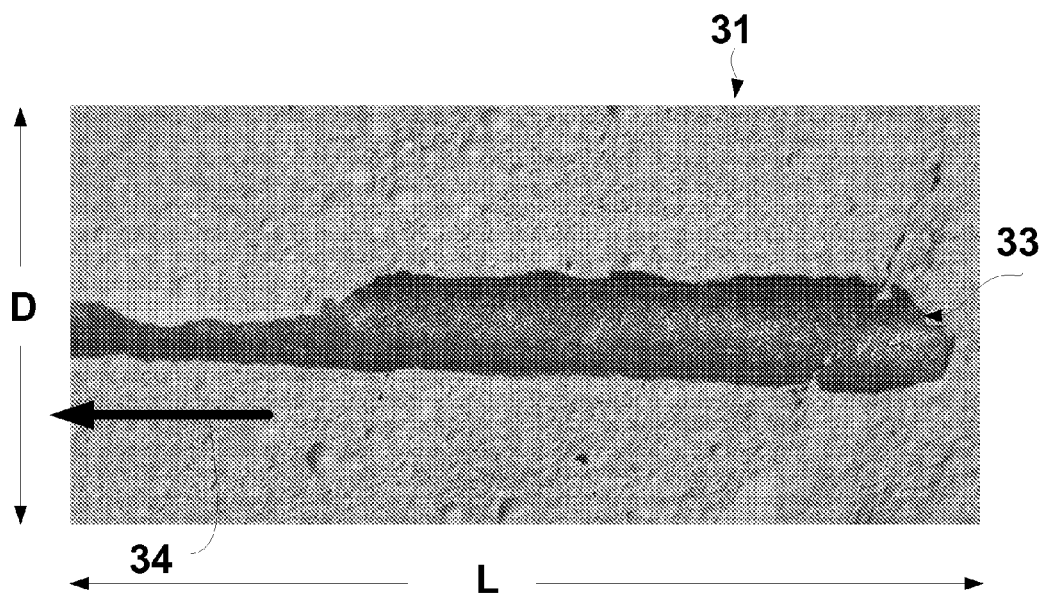
FIG. 4 is a photograph of the split section of the mortar cylinder of FIG. 3 after the rod has been removed from the mortar cylinder.

Refer to FIG. 4, a view of the cross section of the cylinder 31 of FIG. 3 with the rod 30 removed completely. The darkened area is the entire void 33 showing the fired coating (or glaze) 22 remaining attached within the cylinder 31 after the experimental rod 30 was pulled out, i.e., the bond of the fired frit-bonding coating (or glaze) 22 to the mortar cylinder 31 was stronger than the bond of the coating (or glaze) 22 to the steel rod 30.

After moist curing, the adhesion between the mortar cylinder 31 and the rods 10, 20 was determined by measuring the peak load required to pull the rods 10, 20 free from the mortar cylinder 31 such that peak load equaled break load. The results of the testing are presented in Table 3. The load required for pull-out was measured by using an MTS Material Testing System (Minneapolis Minn.).

TABLE 3

Results of Pull-out Test of Steel Rods in Moist-Cured Mortar

| Specimen | Break Load (lbf) |
|---|---|
| Control #1 | 735.9 |
| Control #2 | 136.8 |
| Control #3 | 749.4 |
| Control #4 | 929.7 |
| Mean | 638.0 |
| Std Deviation | 345.6 |
| Frit #1 w/PC (700° C.) | 1927.0 |
| Frit #2 w/PC (700° C.) | 1936.3 |
| Frit #3 w/PC (700° C.) | 1441.5 |
| Mean | 1768.3 |
| Std Deviation | 283.0 |

Results for the control rods 10 were similar to those obtained with earlier tests with similar uncoated rods. The greatest adhesion between the experimental rods 20 and the mortar cylinder 31 was noted with the experimental rods 20 that were treated with a coating (or glaze) containing a frit-bonding combination of a glass frit and portland cement, i.e., a coating (or glaze), that was fired on the rod 20. Coating with the "frit-bonding" coating (or glaze) of Type I-II portland cement and glass frit and firing the resultant coating (or glaze) produced adhesion that was nearly three times greater than that measured for the control rods 10 alone.

In select embodiments of the present invention, the fit-bonding coating (or glaze) combining a commercial glass frit and Type I-II portland cement performs better than the fusing of Type I-II portland cement to an established enamel or abrading the enamel and fusing the Type I-II portland cement thereto, the latter two described above as approaches one and two, respectively.

In summary, investigation proved that it is possible to bond grains of Type I-II portland cement in mortar paste to portland cement grains, or any refractory mineral phases such as mica or quartz, that are bonded to steel via a "frit-bonding" coating (or glaze) employing a commercial glass frit to establish a bond with the steel. The bond thus achieved between the mortar and the steel significantly improves the steel reinforcement of conventional concrete structures such as roadways, bridge decks, foundations, and the like.

The abstract of the disclosure is provided to comply with the rules requiring an abstract that will allow a searcher to quickly ascertain the subject matter of the technical disclosure of any patent issued from this disclosure. 37 CFR §1.72 (b). Any advantages and benefits described may not apply to all embodiments of the invention.

While the invention has been described in terms of some of its embodiments, those skilled in the art will recognize that the invention can be practiced with modifications within the spirit and scope of the appended claims. For example, although the system is described in specific examples for improving the bond of reinforcement in cement-based matrices, it may apply to any number of applications including structure that may not employ a cement-based matrix but that does utilize reinforcement bonded thereto. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Thus, it is intended that all matter contained in the foregoing description or shown in the accompanying drawings shall be interpreted as illustrative rather than limiting, and the invention should be defined only in accordance with the following claims and their equivalents.

We claim:

1. A configuration and a reinforcing material, said configuration affixed to said reinforcing material for forming a bond between said reinforcing material and an initially flowable matrix incorporating said reinforcing material, comprising: at least one frit, said at least one frit comprising at least a powdered alkali resistant glass frit compatible with said matrix and said reinforcing material; and refractory material compatible with said matrix, said refractory material comprising at least dry portland cement, said reinforcing material and said at least one frit, wherein said refractory material is combined with said at least one frit to yield at least one coating on said reinforcing material, and wherein at least one surface of said reinforcing material is prepared for accepting said at least one coating, and wherein said at least one coating comprising said at least one frit and said refractory material is fired at a temperature regime over a time period to form a coating comprising refractory material and frit wherein the frit flows and consolidates to form the fired coating.

2. The configuration of claim 1 in which said reinforcing material is material selected from the group consisting of: metal fibers, metal rods, steel fibers, steel rods, metal alloy fibers, metal alloy rods, metal, metal alloys, steel, stainless steel, aluminum, copper, material plated with metal, and combinations thereof.

3. The configuration of claim 2 in which said steel, steel fibers and steel rods are selected from the group consisting of: low-carbon steel; decarburized steel; interstitial-free steel; titanium-stabilized steel, and combinations thereof.

4. The configuration of claim 1 in which said initially flowable matrix comprises cement-based pastes selected from the group consisting of: portland cement-based mortars;

portland cement-based concretes; phosphate-cement based mortars; phosphate-cement based concretes; aluminum silicate cement-based mortars; aluminum silicate cement-based concretes, and combinations thereof.

5. The configuration of claim 1 in which said at least one frit is selected from the group consisting of: a ground glass, a ground glass slag, a frit suspended in a liquid, a glass frit suspended in a liquid, a frit suspended in a liquid incorporating a thickener, a powdered frit, a powdered glass frit, a frit containing transition metals, a frit containing cobalt, a frit containing nickel, an alkali resistant glass frit, an alkali-resistant groundcoat enamel, and combinations thereof.

6. The configuration of claim 1 in which said at least one frit comprises at least one powdered glass frit and said refractory material comprises at least one dry refractory material.

7. The configuration of claim 1 in which said powdered alkali resistant glass frit comprises at least one enamel groundcoat.

8. The configuration of claim 1 in which said at least one coating comprises at least one liquid glass frit suspension and at least one dry refractory material.

9. The configuration of claim 1 in which said at least one coating comprises a volume amount of said frit approximately equal to a volume amount of said refractory material.

10. The configuration of claim 1 in which said at least one coating is amenable to application via a method from the group consisting of: spraying, dipping, brushing, flowing on, electrostatic spraying, rolling, and combinations thereof.

11. The configuration of claim 1, said at last one coating resulting in corrosion resistance of said reinforcing material.

12. A configuration and a reinforcing material, said configuration affixed to said reinforcing material for forming a bond between said reinforcing material and an initially flowable matrix incorporating said reinforcing material, comprising: at least one frit compatible with said matrix and said reinforcing material; and refractory material compatible with said matrix, said reinforcing material and said at least one frit, wherein said refractory material is combined with said at least one frit to yield at least one coating on said reinforcing material, and wherein at least one surface of said reinforcing material is prepared for accepting said at least one coating, and wherein said at least one coating comprising said at least one frit and said refractory material is fired at a temperature regime over a time period to form a coating comprising refractory material and frit wherein the frit flows and consolidates to form the fired coating, wherein said at least one said dry refractory material is dry portland cement and said at least one glass fit is a liquid alkali resistant glass fit suspension.

13. The configuration of claim 12 in which said liquid alkali resistant glass frit suspension is at least one enamel groundcoat.

* * * * *